United States Patent [19]
Oestreich

[11] Patent Number: 4,772,091
[45] Date of Patent: Sep. 20, 1988

[54] LIGHT WAVEGUIDE CABLE

[75] Inventor: Ulrich Oestreich, Munich, Fed. Rep. of Germany

[73] Assignee: Siemens Aktiengesellschaft, Berlin and Munich, Fed. Rep. of Germany

[21] Appl. No.: 495,580

[22] Filed: May 18, 1983

[51] Int. Cl.⁴ .............................................. G02B 6/44
[52] U.S. Cl. ............................... 350/96.23; 350/96.34
[58] Field of Search ........................... 350/96.23, 96.34

[56] References Cited

U.S. PATENT DOCUMENTS

| | | |
|---|---|---|
| 4,231,635 | 11/1980 | Zeidler et al. ................... 350/96.23 |
| 4,304,462 | 12/1981 | Boba et al. ....................... 350/96.23 |
| 4,318,588 | 3/1982 | Zeidler et al. ................... 350/96.23 |

FOREIGN PATENT DOCUMENTS 2628069  8/1977  Fed. Rep. of Germany .

*Primary Examiner*—William L. Sikes
*Assistant Examiner*—Robert E. Wise
*Attorney, Agent, or Firm*—Hill, Van Santen, Steadman & Simpson

[57] ABSTRACT

A light waveguide cable has a multi-ply, thermally stable cladding as a short-term protection for the cable core. The cladding has at least one closed ply of glass thread saturated with high-temperature-resistant lacquer as a length-determining support, tension element, and heat barrier. At least one closed ply of glass thread and/or aramid thread as an additional tension element and heat barrier is provided. Finally, at least one jacket serves as a retainer for the plies and forms a flame-retardant heat barrier having high energy consumption upon vaporization.

6 Claims, 1 Drawing Sheet

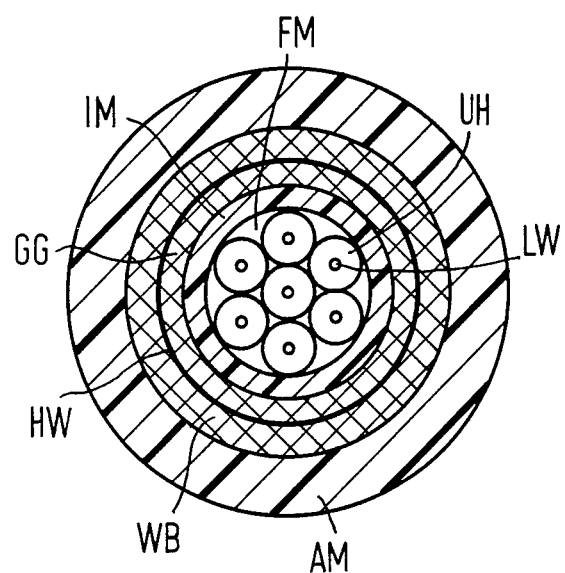

LIGHT WAVEGUIDE CABLE

BACKGROUND OF THE INVENTION

The invention relates to a light waveguide cable having at least one light waveguide lead disposed in the cable core and having a multi-layer or multi-ply casing or shell.

A cable of this type is known from German AS No. 26 28 069 incorporated herein by reference whereby synthetic threads are provided as tension-proof elements. Accordingly, however, the hazard exists that these largely lose their tenacious properties due to extremely high temperatures such as can occur given, for example, a rocket launching or a nuclear explosion, and thus are no longer in a position given a subsequent tensile stress (for example, given a blast wave following the explosion) to sufficiently mechanically protect the sensitive fiber-like light waveguides.

SUMMARY OF THE INVENTION

An object of the present invention is to create a light waveguide cable which is not only highly flame-resistant but, rather, which is also in a position to sufficiently protect the fiber-like light waveguides against undesired tensile and crushing stresses in the case of a thermal shock with a following blast wave. Given a light waveguide cable of the type initially cited, this is inventively achieved in that a multi-layer or multi-ply thermally stable cladding or shell is provided as a short-term protection of the cable core, whereby said cladding or shell has the following:

(a) at least one closed ply of glass thread (GG) saturated with high-temperature-resistant lacquer as a length-determining support and tension element and heat barrier;

(b) at least one closed ply of glass thread and/or aramid thread as an additional tension element and heat barrier; and (c) at least one jacket which serves as a retainer for the plies according to (a) and (b) and which forms a flame-retardant heat barrier with high energy consumption upon evaporation or vaporization.

Due to their closed ply, the glass threads saturated with temperature-proof lacquer produce a good stability and thermal protection of the light waveguides. This similarly applies to the glass or aramid threads of the further ply. In addition, the jacket contributes to the protection of the overall arrangement as a heat barrier.

Polyester imide lacquers are preferably employed for the glass threads. Parting compounds, particularly in the form of powder or silicon oil, can be advantageously employed between the threads.

It is further expedient to provide an alternating stranding direction (SZ stranding) for at least one of the plies.

A material having a great thermal absorption capability is preferably employed for the outer jacket. Fluoro polymers such as for example fluoroethylenepropylene (FEP) or perfluoroalkoxy (PFA) are particularly suited for this purpose.

A particularly advantageous embodiment of a cable according to this invention is characterized in that the light waveguides are provided with a solid cladding or shell of cross-linked material, that the cable core contains a temperature-stable filling compound, that the inside jacket consists of flame-retardant polyurethane rubber, and that at least one tightly closed ply of glass threads saturated with a high-temperature-resistant lacquer follows the inside jacket toward the outside as a protection against heat and compression.

The solid cladding or shell of the light waveguides with a cross-linked material, particularly polyurethane acrylate, renders this insensitive to cross-forces. Since the filling compound of the cable core is temperature-stable and, for example, consists of silicone grease or silicone rubber, the cable core exhibits a particularly high resistance to high temperatures. Sticking of the fiber claddings is also prevented. A further protection of the cable core against high temperatures is achieved in that the inner jacket consists of flame-retardant polyurethane rubber so that even extremely high thermal loads will only effect the cable core to a slight degree. Since it is saturated with a high-temperature-resistant lacquer, the tightly closed ply of glass threads applied as armoring to the inner jacket produces the advantage that the favorable mechanical properties (tensile strength and support properties) are largely retained even given great temperature loads.

Since the tensile elements in the form of an armoring consisting of glass threads are not completely sufficient for the absorption of the standard stresses, i.e. stresses occurring within the framework of a normal laying of light waveguide cables, it is expedient to apply an additional armoring in the form of tensile elements further toward the outside. This can advantageously consist of an aromatic polyamide. Not only are the mechanical properties improved during normal use of the cable, but also it is additionally guaranteed that a supplementary thermal protection for the tensile, heat-resistant glass threads lying further toward the inside is also achieved. The tensile elements additionally applied in this manner are advantageously provided with a preferably inorganic, particularly flake-like external thermal protection introduced into the filament bundles in, for example, the form of talcum powder, graphite, $MO\ S_2$, calcium carbonate, aluminum powder or the like, whereby the effective thermal insulation is further improved for these elements and the heat-resistant glass threads. The outer jacket preferably consists of a material which exhibits a particularly high heat absorption powder and is non-combustible itself. Teflon FEP or PFA materials ("Teflon" is a trademark of the DuPont Company) can be advantageously employed for this purpose, being extrudable and being capable of processing with an extrusion temperature on the order of $\leq 350°$ C.

It is expedient to color the outer layer of the jacket light and/or to design it in heat-reflecting fashion because the thermal absorption can be kept particularly low by so doing.

BRIEF DESCRIPTION OF THE DRAWINGS

An embodiment of a light waveguide cable constructed according to the invention is illustrated in cross-section in the FIGURE.

DESCRIPTION OF THE PREFERRED EMBODIMENTS

The light waveguide cable has seven fiber-like light waveguides LW provided in the inside surrounded with a solid cladding UH or shell (protective layer-"buffer") of preferably cross-linked polyurethane acrylate. Instead of polyurethane acrylate, silicone rubber or some other cross-linked material could be employed. The compound for the core filling FM consists of a temperature-resistant material (for example, on a silicone base) in order on the one hand to guarantee the longitudinal tightness of the cable and, on the other hand, to additionally improve the thermal protection of the clad light waveguides LW and to prevent the sticking of the fiber cushion ("buffer"). The cable core is surrounded by a multi-ply jacket, whereby the inner jacket IM consists of a flame-retardant polyurethane rubber. Next following is a tightly closed ply of glass threads GG saturated with a cured or hardened polyesterimide lacquer. These saturated glass threads form a heat-resistant protective layer which, at the same time, exhibits the property of acting as a tension-proof element and as a support element. Polyesterimide lacquers are particularly insensitive to heat. The threads, to prevent sticking to one another, are expediently treated with silicone grease, silicone oil or an inorganic powder.

Further toward the outside a retaining helix HW is provided. Next, a further armoring WB in the form of a ply of aramid threads follows. These threads are correspondingly spun on and are advantageously provided at the outside with a highly heat-resistant powdering AM, for example talcum. This powdering acts as an additional heat shield for the aramid thread and all elements lying therebelow. As already mentioned, this jacket advantageously consists of a material which exhibits a high heat consumption but is not combustible itself (for example FEP or PFA).

Before damage can occur to the tensile and heat-resistant glass threads GG, the outer jacket AM must have entirely burned off, the heat shield of the talcum powder at the additional tensile elements of the further armoring must also have been destroyed, and the armoring must likewise have been damaged due to the influence of heat. Damage to the heat-resistant glass threads GG is sufficiently alleviated due to the great temperature from the outside toward the inside occurring as a result of the high thermal resistance and of the good insulation, even given great thermal influence from the outside, so that the glass threads GG retain their tensile properties.

The heat-resistant glass threads GG functioning as tensile and support elements should be applied in closed fashion with a diameter of at least 0.5 to 2 mm, whereas a wall thickness of at least 0.5 to 2 mm is preferable for the outer jacket AM. A wall thickness between 0.3 and 0.6 mm is advantageous for the further armoring WB, whereas the inner jacket IM should exhibit wall thicknesses between 0.5 and 1 mm. The length of lay of the glass threads GG should lie between 50 and 250 mm in order to guarantee a sufficient longitudinal tensile strength.

Although various minor changes and modifications might be proposed by those skilled in the art, it will be understood that I wish to include within the claims of the patent warranted hereon all such changes and modifications as reasonably come within my contribution to the art.

I claim as my invention:

1. A light waveguide cable, comprising:
at least one light waveguide disposed in a core of the cable;
surrounding the light waveguide a multi-ply, thermally stable cladding system for protection of the cable, and said cladding system having
   (a) at least a first closed ply means of glass thread saturated with high-temperature-resistant lacquer as a length-determining support, as a tensile element, and as a heat barrier,
   (b) at least a second closed ply means formed of at least one of the elements selected from the group consisting of glass thread and aramid thread as an additional tensile element and heat barrier,
   (c) at least one jacket means as a retainer for the first and second closed ply means and which forms a flame-retardant heat barrier which maximizes energy consumption during vaporization, said jacket means comprising a fluoropolymer, and
   (d) a parting agent provided between the threads.

2. A light waveguide cable, comprising:
at least one light waveguide disposed in a core of the cable;
surrounding the light waveguide a multi-ply, thermally stable cladding system for protection of the cable, and said cladding system having
   (a) at least a first closed ply means of glass thread saturated with high-temperature-resistant lacquer as a length-determining support, as a tensile element, and as a heat barrier,
   (b) at least a second closed ply means formed of at least one of the elements selected from the group consisting of glass thread and aramid thread as an additional tensile element and heat barrier,
   (c) at least one jacket means as a retainer for the first and second closed ply means and which forms a flame-retardant heat barrier which maximizes energy consumption during vaporization, said jacket means comprising a fluoropolymer,
   (d) a parting agent provided between the threads, and
   (e) the parting agent being formed of an element selected from the group consisting of an inorganic powder and silicone oil.

3. A light waveguide cable, comprising:
at least one light waveguide;
an inner jacket surrounding the at least one light waveguide;
a first closed ply means of glass thread following the inner jacket and saturated with a high-temperature-resistant chemical as a length-determining support, as a tensile element, and as a heat barrier;
at least a second closed ply means following the first ply means and formed of at least one of the elements selected from the group consisting of glass thread and aramid thread as an additional tensile element and heat barrier;
an outer jacket comprising fluoropolymer following the second closed ply means as a retainer for the first and second closed ply means and which forms a flame-retardant heat barrier which maximizes energy consumption upon vaporization; and
a high-temperature-resistant filling compound constructed on a silicone base being provided within the inner jacket.

4. A light waveguide cable, comprising:
at least one light waveguide;
an inner jacket surrounding the at least one light waveguide;
a first closed ply means of glass thread following the inner jacket and saturated with a high-temperature-resistant chemical as a length-determining support, as a tensile element, and as a heat barrier;
at least a second closed ply means following the first ply means and formed of at least one of the elements selected from the group consisting of glass thread and aramid thread as an additional tensile element and heat barrier;

an outer jacket comprising fluoropolymer following the second closed ply means as a retainer for the first and second closed ply means and which forms a flame-retardant heat barrier which maximizes energy consumption upon vaporization;

the second ply means comprising a further armoring in the form of a ply of aramid threads provided in a closed ply outside of the first ply means glass threads; and the further armoring being provided with a flake-like inorganic thermal protection.

5. A light waveguide cable, comprising:

at least one light waveguide;

an inner jacket surrounding the at least one light waveguide;

a first closed ply means of glass thread following the inner jacket and saturated with a high-temperature-resistant chemical as a length-determining support, as a tensile element, and as a heat barrier;

at least a second closed ply means following the first ply means and formed of at least one of the elements selected from the group consisting of glass thread and aramid thread as an additional tensil element and heat barrier;

an outer jacket comprising fluoropolymer following the second closed ply means as a retainer for the first and second closed ply means and which forms a flame-retardant heat barrier which maximizes energy consumption open vaporization; and the at least one waveguide having its own cladding comprising silicone rubber.

6. A light waveguide cable, comprising:

at least one light waveguide;

an inner jacket surrounding the at least one light waveguide;

a first closed ply means of glass thread following the inner jacket and saturated with a high-temperature-resistant chemical as a length-determining support, as a tensile element, and as a heat barrier;

at least a second closed ply means following the first ply means and formed of at least one of the elements selected from the group consisting of glass thread and aramid thread as an additional tensile element and heat barrier;

an outer jacket comprising fluoropolymer following the second closed ply means as a retainer for the first and second closed ply means and which forms a flame-retardant heat barrier which maximizes energy consumption upon vaporization; and the first ply means glass threads being protected against sticking by means of a coating comprised of a temperature-resistant parting agent.

* * * * *